United States Patent [19]

Taubitz et al.

[11] Patent Number: 5,021,508

[45] Date of Patent: Jun. 4, 1991

[54] THERMOPLASTIC MOLDING MATERIALS CONSISTING OF POLYESTERS AND POLYCARBONATES AND HAVING A GOOD LOW-TEMPERATURE IMPACT STRENGTH

[75] Inventors: Christof Taubitz, Wachenheim; Hans-Henning Hub, Worms; Walter Ziegler, Edingen-Neckarhausen; Juergen Sadlowski, Muenster-Hiltrup, all of Fed. Rep. of Germany

[73] Assignee: BASF Aktiengesellschaft, Ludwigshafen, Fed. Rep. of Germany

[21] Appl. No.: 488,428

[22] Filed: Feb. 27, 1990

Related U.S. Application Data

[63] Continuation of Ser. No. 289,430, Dec. 22, 1988, abandoned, which is a continuation of Ser. No. 145,705, Jan. 15, 1988, abandoned, which is a continuation of Ser. No. 875,576, Jun. 18, 1986, abandoned.

[30] Foreign Application Priority Data

Jun. 20, 1985 [DE] Fed. Rep. of Germany ....... 3521956

[51] Int. Cl.$^5$ .................. C08L 69/00; C08L 67/02
[52] U.S. Cl. .................. 525/133; 525/148
[58] Field of Search .................. 525/146, 148, 133

[56] References Cited

FOREIGN PATENT DOCUMENTS 017150 2/1983 Japan .
05117 11/1985 PCT Int'l Appl. .

*Primary Examiner*—Melvyn I. Marquis
*Assistant Examiner*—David Buttner
*Attorney, Agent, or Firm*—Keil & Weinkauf

[57] ABSTRACT

Thermoplastic molding materials which consist of polyesters and polycarbonates and have good low-temperature impact strength contain (A) from 5 to 94 parts by weight of one or more aliphatic polyesters of an aromatic dicarboxylic acid,
(B) from 5 to 94 parts by weight of one or more aromatic polycarbonates,
(C) from 1 to 40 parts by weight of one or more olefin polymers which contain epoxide groups, the amounts of components A, B and C summing to 100 parts by weight, and, if required, (D) additives in effective amounts.

3 Claims, No Drawings

THERMOPLASTIC MOLDING MATERIALS CONSISTING OF POLYESTERS AND POLYCARBONATES AND HAVING A GOOD LOW-TEMPERATURE IMPACT STRENGTH

This application is a continuation of application Ser. No. 07/289,430, filed on Dec. 22, 1988, now abandoned, which is a continuation of application Ser. No. 07/145,705, filed on Jan. 15, 1988, now abandoned, which is a continuation of application Ser. No. 875,576, filed on June 18, 1986, now abandoned.

The present invention relates to thermoplastic molding materials which consist of polyesters and polycarbonates, have not only good low-temperature impact strength but also very good hole-notch impact strength at low temperatures and are distinguished by high heat distortion resistance.

Polymer blends of thermoplastic polyesters and polycarbonates are disclosed in DE-A-24 17 002. They have better mechanical properties than pure polyesters. Attempts have already been made to improve the impact strength of polyester/polycarbonate blends by adding elastomers. According to German Patent 2,343,609, suitable modifiers are grafted copolymers based on polybutadiene. EP-A 20 605 also recommends polyacrylate graft rubbers for this purpose. EP-A 20 737 describes mixtures in which polyester/polycarbonate blends are modified with styrene/diene block copolymers. German Laid-Open Application DOS 2,622,876 discloses blends which consist of a polycarbonate and an ethylene copolymer or of a polyester and an ethylene copolymer, the copolymer being added to improve the impact resistance. According to German Laid-Open Application DOS 3,234,174, ethylene copolymers containing carboxyl groups have also been added to blends of polycarbonates and polyesters.

However, all known blends possess unsatisfactory notched impact strengths at low temperatures; in particular, low-temperature impact strength coupled with good heat distortion resistance has not been achieved.

It is an object of the present invention to provide impact-resistant thermoplastic molding materials which are distinguished by good mechanical properties and possess good hole-notch impact strength at low temperatures and good heat distortion resistance.

We have found that this object is achieved by thermoplastic molding materials which consist of a polyester and a polycarbonate, have good low-temperature impact strength and contain (A) from 5 to 94 parts by weight of one or more aliphatic polyesters of an aromatic dicarboxylic acid, (B) from 5 to 94 parts by weight of one or more aromatic polycarbonates, (C) from 1 to 40 parts by weight of one or more olefin polymers which contain epoxide groups, the amounts of components A, B and C summing to 100 parts by weight, and, if required, (D) additives in effective amounts.

The novel impact-resistant thermoplastic molding materials possess good mechanical properties as well as good notched impact strengths at low temperatures and good hole-notch impact strengths coupled with high heat distortion resistance.

The polyesters (component A) used according to the invention are known per se. They possess chain units which contain an unsubstituted or substituted aromatic ring in the polymer chain. Examples of such substituents on the aromatic ring are halogen, such as chlorine or bromine, and $C_1$–$C_4$-alkyl, such as methyl, ethyl, propyl or butyl. Suitable polyesters are prepared, for example, by reacting the corresponding aromatic dicarboxylic acids, their esters or their ester-forming derivatives with dihydroxy compounds in a conventional manner. Examples of suitable dihydroxy compounds are glycols of 2 to 6 carbon atoms, in particular ethylene glycol, butane-1,4-diol, butene-1,4-diol and hexane-1,6-diol as well as hexane-1,4-diol, cyclohexane-1,4-diol, 1,4-bis-(hydroxymethyl)-cyclohexane, bisphenol A, neopentylglycol and mixtures of these.

Examples of suitable aromatic dicarboxylic acids are naphthalenedicarboxylic acid, terephthalic acid. isophthalic acid, their ester-forming derivatives and mixtures of these.

In the polyesters, some, eg. up to 10 mol %, of the aromatic dicarboxylic acids may be replaced with other dicarboxylic acids. Suitable modifiers are aliphatic or cycloaliphatic dicarboxylic acids, such as adipic acid, azelaic acid, sebacic acid and cyclohexanedicarboxylic acid.

Preferred polyesters are polyalkylene lerephthalates which are derived from alkanediols of 2 to 6 carbon atoms. Polybutylene terephthalate and in particular polyethylene terephthalate are preferred. The polyesters (component A) advantageously have a relative viscosity of from 1.2 to 1.8, measured in a 0.5% strength by weight solution in a mixture of phenol and o-dichlorobenzene in a weight ratio of 3:2, at 25° C.

The novel molding materials contain from 5 to 94, in particular from 10 to 70, parts by weight of one or more aliphatic polyesters of an aromatic dicarboxylic acid.

The aromatic polycarbonates used according to the invention (component B) are known per se. They are obtainable, for example, by boundary polycondensation by the process described in German Patent 1,300,266, or by transesterification of diphenyl carbonate with bisphenol A by the process described in German Laid-Open Application DOS 1,495,730. Instead of bisphenol A, it is possible to use, for example, up to 30 mol% of other aromatic bishydroxy compounds, in particular 2,2-bis-(4-hydroxyphenyl)-pentane, 2,6-dihydroxynaphthalene, bis-(4-hydroxyphenyl) sulfone, bis-(4-hydroxyphenyl) ether, bis-(4-hydroxyphenyl) sulfide, bis-(4-hydroxyphenyl)-methane, 1,1-bis-(4-hydroxyphenyl)ethane or 4,4'-dihydroxydiphenyl.

Polycarbonates suitable for the novel purpose advantageously have a relative viscosity (measured at 25° C. in a 0.5% strength by weight methylene chloride solution) of from 1.2 to 1.5, preferably from 1.28 to 1.40.

The novel molding materials contain from 5 to 94, preferably from 30 to 90, parts by weight of one or more aromatic polycarbonates.

The molding materials according to the invention contain, as component C, from 1 to 40, preferably from 5 to 20, % by weight of one or more olefin polymers which contain epoxide groups. The epoxide groups can be incorporated into the olefin polymer by copolymerization or graft polymerization with epoxide-carrying copolymerizable monomers, or by epoxidation of a reactive olefin polymer. Component C is advantageously composed of from 0.1 to 50, in particular from 0.5 to 10, % by weight of monomers possessing epoxide groups.

Preferred copolymers are those which consist of not less than 50 mol %, in particular not less than 50% by weight, of one or more olefins of 2 to 10 carbon atoms and additionally contain one or more copolymerizable monomers possessing epoxide groups and, if required, further copolymerizable monomers.

Such copolymers are preferably based on the following olefins: ethylene, propylene, but-1-ene, isobutylene, pent-1-ene, hex-1-ene, hept-1-ene, oct-1-ene or mixtures of these, preferably ethylene and propylene.

The preferred epoxide-carrying monomers are ethers of the general formula

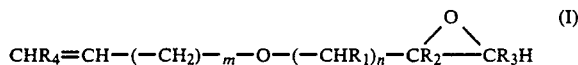

where m is an integer from 0 to 20, n is an integer from 1 to 10 and $R_1, R_2, R_3$ and $R_4$ are each H or alkyl.

m is preferably 0 or 1, n is preferably 1 and $R_1, R_2$ and $R_3$ are each preferably H.

Preferred compounds are allyl glycidyl ethers or vinyl glycidyl ethers. Other epoxide-carrying monomers are epoxide-carrying olefins of the general formula

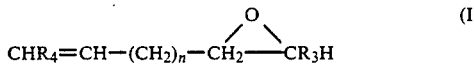

where $m, R_2, R_3$ and $R_4$ have the same meanings as in formula I, but n is preferably from 1 to 5, $R_4$ is preferably H or methyl and $R_2$ and $R_3$ are each preferably H, methyl or ethyl.

Epoxide-carrying esters of acrylic acid or methacrylic acid are particularly preferred. Glycidyl acrylate and glycidyl methacrylate have become particularly important industrially.

Preferred olefin polymers are composed of
a) from 50 to 99% by weight of olefins of 2 to 10 carbon atoms, preferably ethylene,
b) from 1 to 50% by weight of glycidyl acrylate and/or glycidyl methacrylate and, if required,
c) from 1 to 49% by weight of one or more other copolymerizable monomers,
the amounts of components a, b and c summing to 100% by weight.

The glass transition temperature of the olefin polymer is preferably below 0° C., particularly preferably below −20° C. Preferred copolymerizable monomers are (meth)acrylates, vinyl esters, vinyl ethers and methylbutenol, for example methyl (meth)acrylate, ethyl (meth)acrylate, propyl (meth)acrylates and butyl (meth)acrylates, particularly preferably n-butyl acrylate and 2-ethylhexyl acrylate.

Particularly preferred olefin polymers are composed of
a) from 50 to 98% by weight of ethylene,
b) from 1 to 40% by weight of glycidyl (meth)acrylate and
(c) from 1 to 45% by weight of n-butyl acrylate and/or 2-ethylhexyl acrylate, and
olefin polymers consisting of
a) from 60 to 95% by weight of ethylene,
b) from 3 to 20% by weight of glycidyl (meth)acrylate and
c) from 10 to 35% by weight of n-butyl acrylate and/or 2-ethylhexyl acrylate
have proven particularly useful.

The olefin polymers can be obtained by any polymerization method, such as random copolymerization, block copolymerization and graft copolymerization.

Random copolymerization under high pressure and at elevated temperatures is preferred. The polymers C) generally have a high molecular weight and a melt flow index (MFI 190/2.16, DIN 53,735) of from 1 to 80.

The molding materials according to the invention may also contain effective amounts, preferably less than 40% by weight, of additives (D), such as other polymers, eg. rubbers.

Examples of conventional additives are stabilizers, antioxidants, heat stabilizers, UV stabilizers, lubricants, mold release agents, colorants, such as dyes and pigments, fibrous and pulverulent fillers and reinforcing agents, and plasticizers. Such additives are employed in the conventional effective amounts.

The stabilizers can be added to the thermoplastic materials at any stage in their preparation. The stabilizers are preferably added at an early stage in order to prevent decomposition beginning before the material can be protected. Such stabilizers must be compatible with the material.

Antioxidants and heat stabilizers which can be added to the thermoplastic materials according to the invention include those which are generally added to polymers, such as halides of metals of group I of the periodic table, eg. a sodium, potassium or lithium halide, in conjunction with a copper(I) halide, eg. the chloride, bromide or iodide. Other suitable stabilizers are sterically hindered phenols, hydroquinones, members of this group carrying various substituents, and combinations of these, in concentrations up to 1% by weight, based on the weight of the mixture.

The UV stabilizers used can likewise be those which are generally added to polymers, these stabilizers being employed in amounts of up to 2.0% by weight, based on the mixture. Examples of UV stabilizers are various substituted resorcinols, salicylates, benzotriazoles, benzophenones etc.

Suitable lubricants and mold release agents, which are added to the thermoplastic material in amounts of, for example, up to 1% by weight, are stearic acids, stearyl alcohol, stearates and stearamides.

Other substances which can be added are organic dyes, such as nigrosine and pigments, eg. titanium dioxide, cadmium sulfide, cadmium sulfide selenide, phthalocyanines, ultramarine blue or carbon black. Furthermore, the novel molding materials may contain fibrous and pulverulent fillers and reinforcing agents, such as carbon fibers, glass fibers, amorphous silica, asbestos, calcium silicate, calcium metasilicate, aluminum silicate, magnesium carbonate, kaolin, chalk, powdered quartz, mica or feldspar, in amounts up to 50% by weight, based on the molding material. Nucleating agents, such as talc, calcium fluoride, sodium phenylphosphinate, alumina or finely divided polytetrafluoroethylene may also be used, in amounts of, for example, up to 5% by weight, based on the material. Plasticizers, such as dioctyl phthalate, dibenzyl phthalate, butylbenzyl phthalate, hydocarbon oils, N-n-butylbenzenesulfonamide and o- and p-toluene-ethylsulfonamide, are advantageously added in amounts of up to about 20% by weight, based on the molding material. Colorants, such as dyes and pigments, can be added in amounts of up to about 5% by weight, based on the molding material.

The molding materials according to the invention are prepared, for example, by mixing the polyesters (component A) and polycarbonates (component B) with the ethylene copolymers (component C), and mixing the elastomers into the molten mixture of polyester and polycarbonate in a conventional mixer, such as a screw extruder, a Brabender mill or a Banbury mill. The material is then extruded, cooled and comminuted. The mixing temperatures are as a rule from 240 to 350° C., preferably from 250 to 280° C.

The molding materials according to the invention are useful for producing, by injection molding or extrusion, heat-stable impact-resistant moldings which can be subjected to high loads and are used for industrial purposes of all types.

The Examples which follow illustrate the invention.

Polyethylene terephthalate (PETP) was mixed thoroughly with a polycarbonate (PC) and the impact modifiers, and the mixture was melted at 270° C., homogenized and extruded into a water bath, these steps being carried out in a type ZKS 30 twin-screw extruder from Werner and Pfleiderer. After granulation and drying, the blends were molded to test specimens on an injection molding machine, and the specimens were tested without further after-treatment.

The polyethylene terephthalate used had a relative viscosity of 1.38, measured in a 0.5% strength solution in 1:1 phenol/o-dichlorobenzene at 25° C.

The bisphenol A-based polycarbonate used had a relative viscosity of 1.36, measured in a 0.5% strength solution in methylene chloride at 25° C.

In Comparative Example 1, an ethylene/ethyl acrylate copolymer (E/EA) from Union Carbide, with the trade name Bakelite DPD-6169, was used.

In Comparative Example 2, an LLDPE (linear low density polyethylene/but-1-ene copolymer) having an MFI of 50 g/10 min was employed.

In Comparative Example 3, an ethylene/n-butyl acrylate/acrylic acid copolymer consisting of 66 parts of ethylene, 30 parts of n-butyl acrylate and 4 parts of acrylic acid and having an MFI of 15 g/10 min was used.

In the Examples according to the invention, the following epoxide-containing copolymers were used (Table 1):

TABLE 1

| Example No. | Copolymer composition, % by weight | MFI 190° C./2, 16 g/10 min |
|---|---|---|
| 4, 7, 9, 10 | E-GMA-nBA (70-4-26) | 5 |
| 8 | E-GMA-AHA (73-7-20) | 13 |
| 6 | E-GA-GMA-nBA (62-1-5-32) | 8 |
| 5, 11 | E-AGE-AHA (66-4-30) | 18 |

E = ethylene
GMA = glycidyl methacrylate
GA = glycidyl acrylate
n-BA = n-butyl acrylate
AHA = 2-ethylhexyl acrylate
AGE = allyl glycidyl ether Table 2 illustrated the advantageous properties of the novel blends (Examples 4 to 11) compared with the comparative examples. The amounts stated are in % by weight.

The notched impact strength was determined according to DIN 53,453, and the hole-notch impact strength according to DIN 53,753.

TABLE 2

| Example No. | PETP % | PC % | Modifier % | Modifier Type | Notched impact strength $a_k$ [kJ/m$^2$] −20° | −40° | Hole notch impact strength $a_{KL}$ −20° | −40° | −60° |
|---|---|---|---|---|---|---|---|---|---|
| 1* | 40 | 50 | 10 | E-EA | 3.2 | 2.4 | 47 | 43 | 34 |
| 2* | 40 | 50 | 10 | LLDPE | 4.1 | 1.4 | 53 | 40 | 20 |
| 3* | 40 | 50 | 10 | E-nBA-AS | 3.6 | 2.3 | 96 | 59 | 44 |
| 4 | 40 | 50 | 10 | E-GMA-nBA | 15.2 | 6.3 | 94 | 84 | 63 |
| 5 | 40 | 50 | 10 | E-AGE-AHA | 16.2 | 7.8 | 96 | 84 | 72 |
| 6 | 30 | 60 | 10 | E-GA-GMA-nBA | 14.1 | 6.7 | 89 | 75 | 62 |
| 7 | 30 | 55 | 15 | E-GMA-nBA | 19.1 | 11.2 | 94 | 80 | 69 |
| 8 | 25 | 60 | 15 | E-GMA-AHA | 22.1 | 8.5 | 95 | 86 | 73 |
| 9 | 45 | 50 | 5 | E-GMA-nBA | 11.0 | 5.3 | 89 | 73 | 60 |
| 10 | 25 | 65 | 5 / 5 | LLDPE / E-GMA-nBA | 9.2 | 4.5 | 75 | 65 | 39 |
| 11 | 15 | 68 | 17 | E-AGE-AHA | 31.4 | 9.6 | 96 | 82 | 75 |

* = Comparative Examples

We claim:

1. A thermoplastic molding material having good low-temperature impact strength which comprises:
    (A) from 5 to 94 parts by weight of one or more aliphatic polyesters of an aromatic dicarboxylic acid,
    (B) from 5 to 94 parts by weight of one or more aromatic polycarbonates, and
    (C) from 1 to 40 parts by weight of one or more olefin polymers which contain epoxide groups and which has a melt flow index (MFI 190/2.16) of from 5 to 13 g/10 min., the amounts of components A, B and C summing to 100 parts by weight of wherein component C is composed of
        a) from 50 to 98% by weight of ethylene,
        b) from 1 to 40% by weight of glycidyl (meth)acrylate and
        c) from 1 to 45% of a material selected from the group consisting of n-butyl acrylate, 2-ethylhexyl acrylate and mixtures thereof.

2. The molding material defined in claim 1 wherein component C has a glass transition temperature $T_g$ of less than -31 20° C.

3. The molding material as defined in claim 1 wherein component C consists of a) from 60 to 95% by weight of ethylene, b) from 3-20% by weight of glycidyl (meth) acrylate and c) from 10 to 35% by weight of a material selected from the group consisting of n-butyl acrylate, 2-ethylhexyl acrylate and mixtures thereof.

* * * * *

UNITED STATES PATENT AND TRADEMARK OFFICE
CERTIFICATE OF CORRECTION

PATENT NO. : 5,021,508

DATED : June 4, 1991

INVENTOR(S) : Christof TAUBITZ et al.

It is certified that error appears in the above-identified patent and that said Letters Patent is hereby corrected as shown below:

Claim 1, Col. 6, Line 51:

That part reading "by weight of wherein"
    Should read -- by weight and wherein --

Claim 2, Col. 6, Line 61:

That part reading "less than -31 20°C."
    Should read -- less than -20°C. --

Signed and Sealed this

Fifteenth Day of September, 1992

Attest:

DOUGLAS B. COMER

*Attesting Officer*      *Acting Commissioner of Patents and Trademarks*